(12) United States Patent
Harmon et al.

(10) Patent No.: US 7,455,773 B1
(45) Date of Patent: Nov. 25, 2008

(54) PACKAGE WASTEWATER CHEMICAL/BIOLOGICAL TREATMENT METHOD

(75) Inventors: John Harmon, Bakersfield, CA (US);
Terry Gong, Bakersfield, CA (US);
Marcus G. Theodore, Salt Lake City, UT (US)

(73) Assignee: Earth Renaissance Technologies, LLC, Salt Lake City, UT (US)

( * ) Notice: Subject to any disclaimer, the term of this patent is extended or adjusted under 35 U.S.C. 154(b) by 0 days.

(21) Appl. No.: 11/893,557

(22) Filed: Aug. 14, 2007

(51) Int. Cl.
*C02F 3/00* (2006.01)

(52) U.S. Cl. .............. 210/603; 210/604; 210/609; 210/614; 210/631; 210/751; 210/764

(58) Field of Classification Search ......... 210/603–604, 210/609, 614, 631, 751, 764
See application file for complete search history.

(56) References Cited

U.S. PATENT DOCUMENTS

| | | | |
|---|---|---|---|
| 4,304,673 A | 12/1981 | Reynolds et al. | |
| 4,334,893 A * | 6/1982 | Lang | 48/202 |
| 4,340,489 A | 7/1982 | Adams et al. | |
| 4,765,911 A | 8/1988 | Rasmussen | |
| 5,906,750 A | 5/1999 | Haase | |

OTHER PUBLICATIONS

United Nations Environmental Programme Division of Technology, Industry, and Economics Newsletter and Technical Publications Freshwater Management Series No. 1, "Bio-solids Management: An Environmentally Sound Approach for Managing Sewage Treatment Plant Sludge."

\* cited by examiner

*Primary Examiner*—Chester T. Barry
(74) *Attorney, Agent, or Firm*—Marcus G. Theodore

(57) ABSTRACT

A chemical/biological wastewater treatment plant method and apparatus employing rapid sludge chemical dewatering technology in conjunction with an environmental biological system for treating the separated treated wastewater by land applying it for plant consumption, and/or passing it through aqueous plant or microbial reduction of the dissolved solids and ammonia for BOD compliance to produce water of sufficient quality to meet open stream and ocean effluent discharge requirements; and disposing of the high BTU low moisture solids.

22 Claims, 3 Drawing Sheets

PACKAGE WASTEWATER TREATMENT SYSTEM

PACKAGE WASTEWATER TREATMENT SYSTEM

PACKAGE WASTEWATER CHEMICAL/BIOLOGICAL TREATMENT METHOD

BACKGROUND OF THE INVENTION

1. Field

This invention comprises a rapidly installed wastewater treatment plant solids and liquids recovery system apparatus and method employing chemical dewatering and biological treatment technology.

2. State of the Art

Various sewage treatment methods and plants are known. Most large municipal systems employ a series of settling ponds sequentially concentrating the solids contained in wastewater either with or without polymers for separation from liquids via mechanical separation means, such as belt presses. In order to produce a clean effluent that can be safely discharged to watercourses, wastewater treatment operations use three or four distinct stages of treatment to remove harmful contaminants; according to the United Nations Environmental Programme Division of Technology, Industry, and Economics Newsletter and Technical Publications Freshwater Management Series No. 1, "*Biosolids Management: An Environmentally Sound Approach for Managing Sewage Treatment Plant Sludge*" which goes on to say: "Each of these stages mimics and accelerates processes that occur in nature.

Preliminary wastewater treatment usually involves gravity sedimentation of screened wastewater to remove settled solids. Half of the solids suspended in wastewater are removed through primary treatment. The residual material from this process is a concentrated suspension called primary sludge, which will undergo further treatment to become biosolids.

Secondary wastewater treatment is accomplished through a biological process, which removes biodegradable material. This treatment process uses microorganisms to consume dissolved and suspended organic matter, producing carbon dioxide and other by-products. The organic matter also provides nutrients needed to sustain the communities of microorganisms. As microorganisms feed, their density increases and they settle to the bottom of processing tanks, separated from the clarified water as a concentrated suspension called secondary sludge, biological sludge, waste activated sludge, or trickling filter humus.

Tertiary or advanced treatment is used when extremely high-quality effluent is required, such as direct discharge to a drinking water source. The solid residual collected through tertiary treatment consists mainly of chemicals added to clean the final effluent, which are reclaimed before discharge, and therefore not incorporated into biosolids.

Combined primary and secondary solids comprise the majority of material used at municipal plants for biosolids production. Careful management throughout the entire treatment process allows plant operators to control the solids content, nutrient value and other constituents of biosolids.

The Municipal Sludge-to-Biosolids Treatment Process

There are three important factors to be addressed through further processing before this material can be utilized: (1) pathogen levels, (2) presence of potentially harmful industrial contaminants, and (3) water content.

The principal process employed to convert municipal sludge into biosolids is called stabilization. Stabilization accelerates the biodegradation of organic compounds, reduces the microbial population including pathogens, and renders the material microbiologically safe for agricultural use. Biological stabilization uses aerobic or anaerobic treatment to reduce the organic content of solids through controlled biodegradation. Chemical stabilization does not reduce the quantity of biodegradable organic matter in solids, but creates process conditions that inhibit microorganisms, thereby slowing the degradation of organic materials and reducing odors. The most common chemical stabilization procedure is to elevate the pH level of the solids using lime or other alkaline materials. Thermal drying and composting can also be used to stabilize biosolids. Full pasteurization of biosolids is not needed when the primary use is cropland application. Any potential risk to human health due to exposure to pathogens is eliminated through proper application procedures and in-situ microbial decomposition.

The presence of contaminants in the sludge or biosolids arising from industrial discharges is a more challenging problem and may be the deciding factor in determining the choice of a utilization disposal option. Put simply, many industries have habitually used the sewer system as a convenient and low-cost way to discharge hazardous wastes. The contaminants accumulate in the biomass and sludge, and can render the material unfit for any beneficial use. The most common options used for disposal of this contaminated material are landfill or incinerations, the cost of which is usually borne by the municipality rather than the hazardous waste generator. Biosolids utilization is a good, environmentally sustainable option when the wastewater is from municipal sources only, or when a fully enforced industrial pre-treatment and discharge control system is in place. The decision to select an environmentally sustainable approach to biosolids management can be used very effectively to review and correct polluting practices up-stream that should not be taking place.

The final concern is the water content of the biosolids product. Primary and secondary sludge generally contain no more than four percent solids, and the storage and transportation costs of this semi-liquid material limit the application to nearby farmland. Processes to remove water from solids, therefore, are common in biosolids production. The simplest method for removing water is gravity thickening, which involves concentration by simple sedimentation. Allowing sufficient time for solids to settle in tanks can increase suspended solids concentration to five or six percent. Thickening can also include flotation processes, gravity drainage belts, perforated rotating drums, and centrifuges. Nothing is added to biosolids during the gravity thickening processes.

Dewatering is another standard method of water removal in biosolids production. Simple dewatering involves containment of wastewater solids in drying beds or lagoons, where gravity, drainage, and evaporation remove moisture. More often, dewatering involves mechanical equipment such as filter presses, vacuum filters, and centrifuges. Mechanically dewatered solids typically contain between 20% and 45% solids. Finally, drying processes can be used to remove even larger volumes of water from biosolids. Thermal drying with direct or indirect dryers followed by polarization can remove virtually all water and stabilize biosolids to the point of full compliance with any regulatory requirement. This method is used where there is a viable commercial market for the palletized product."

Thus a particular wastewater treatment facility design is highly dependent upon the wastewater inflows and sludge composition and the discharge and treatment permitting restrictions and plant objectives. Oftentimes these plant designs employ thermophilic and other digestion processes to break down the sludge as part of the separation process. For example, Haase, U.S. Pat. No. 5,906,750 discloses a method for dewatering of sludge that has been digested by a thermophilic digestion process employing polymers. The polymers are extremely hydrophilic as they agglomerate fine particles for separation from the wastewater in the belt presses. This gelatinous mechanically separated mass is then usually land filled or admixed with other fuels for burning, and may contain significant pathogens and heavy metals. Once deposited and covered, these landfills do not breakdown rapidly. They comprise large deposits of unstable gelatinous soil, which acts as a breading ground for pathogens. If these separated solids are treated with chlorine for pathogen kill, chlorinated carcinogens often result, creating a different environmental hazard.

The mechanically separated gray water by-product is usually not treated and is then used for agricultural application, or dumped into a body of water for dilution. If treated with chlorine to kill pathogens before land application or dumping, its usage for agricultural purposes is lost as chlorine acts as an herbicide.

In addition, mechanical sludge separation typically requires a large series of settling ponds with wastewater residence times therein typically from 24 to 48 hours, depending upon the weather and nature of the sludge processed. Typically, landfill and polymer costs comprise approximately 30 percent of the wastewater treatment costs.

Other mechanical filtration methods provide sludge separation, but require continual unplugging of the filters; thereby generating significant ongoing costs of filter replacement and declining effectiveness as the filter is entrained with the separated solids.

As long as a mechanical sewage separation plant does not have to be moved and operates within its environmental discharge and landfill permit constraints, it provides a low operating and maintenance cost effective sewage disposal method but requires significant upfront capital investment and may result in long term environmental clean-up costs. As urban populations being served grow, and landfill costs increase, these plants seldom meet permitting constraints without significant upgrades in design, particularly with respect to pathogen gray water discharge and the negative impacts caused by mountains of gelatinous solids.

Other chemical wastewater treatment methods employ chemical agglomeration and disposal methods, such as Adams et al., U.S. Pat. No. 4,340,489 wherein wastewater is treated with sufficient sulfurous acid to effectuate disinfection. Polymers and other separation methods are then employed to remove the solids. Reynolds et. al, U.S. Pat. No. 4,304,673 is another wastewater treatment process employing chemicals to continuously disinfect sewage sludge in a similar manner as Adams et al. Rasmussen, U.S. Pat. No. 4,765,911 is another two-stage chemical treatment process for treating aerobic or anaerobic sewage sludge. These chemical wastewater treatment methods are not package systems, which can be moved as needed to accommodate the needs of a community, particularly in riparian areas subject to flooding, and rely heavily on polymers. They do not address BOD's and ammonia in treated wastewater.

Thus there remains a need for a method and apparatus, which provides a stand alone rapidly installed mobile package sewage treatment system, or which can retrofit existing plants to provide a plant to chemically treat and recover wastewater solids and liquids for subsequent environmental biological usage and polishing. The method and apparatus described below provides such an invention.

SUMMARY OF THE INVENTION

The present invention comprises a double pass through skid mounted package wastewater treatment plant initially separating the suspended solids from the liquids for subsequent combination chemical dewatering and biological treatment.

Method

The method comprises a package chemical/biological wastewater treatment plant method for wastewater with dissolved and undissolved solids, which can be chemically dewatered by the injection of sulfinur dioxide to condition and deodorize liquids and solids for recovery. Wastewater, as used herein, is principally directed to domestic sewage from dwellings, business buildings, institutions, which contain ground water, surface waster, and/or storm water. It is not restricted to wastewater, which has already undergone primary and secondary treatment according to conventional treatment processes. However, the method is employed primarily as a primary treatment process. It can also address other industrial wastes displaying the same conditioning and deodorizing characteristics in response to sulfur dioxide treatment. The method comprises passing variable wastewater inflows through filtration means, which separate suspended solids in the wastewater from the liquids. The liquids are then treated with sulfurous acid until the desired disinfection and conditioning occurs in a series of dwell tanks. A side stream of the sulfurous acid treated wastewater is then periodically reinjected into the filtration means to disinfect and dewater the solids with a second pass there through.

Preferred filtration means are woven bags railer mounted slide on containers, which collect the filtered water for subsequent acid treatment. This allows filled bags to be hauled off to a landfill or incinerator without excessive handling.

Although Sulfur dioxide from tanks associated with a contact mixer can be used to acidify the filtered wastewater, a sulfurous acid generator, such as those produced and distributed by Harmon International, LLC of Bakersfield, Calif., is preferred as they produce the chemicals on an as needed basis in an aqueous form preventing harmful operator exposure. The sulfur dioxide is injected into the wastewater at a pH between approximately 1.5 and approximately 3.5, depending upon the dwell time required for conditioning and disinfection. At these pH ranges, sufficient $SO_2$ is generated to condition solids for separation, and disinfection and deodorizing the wastewater. Thus, by prefiltering the solids in the wastewater inflows, the filtered wastewater can pass directly through a sulfurous acid generator without fouling. It was found through testing that sulfurous acid generators, such as the Harmon Systems International, LLC models condition and treat incoming raw wastewater solids to self agglomerate into colloidal self adhering solids so that they do not adhere to the surfaces of the sulfur generator. Thus, these sulfurous acid generators produce a sulfurous acid treated wastewater solids and liquid composition having a pH of approximately 1.5 to 3.5; provided the larger foreign matter is first coarsely screened with a filter or commutated with a grinder so that the larger particles do not obstruct the sulfurous acid generator. This equipment has been shown to provide an excellent means which insures effective $SO_2$ contact with the wastewater solids and liquids. The acid generator also has the advantage of generating $SO_2$ as needed, avoiding the dangers of stored $SO_2$ tank storage. However, the main advantage in passing the wastewater directly through the sulfrous acid generator is that it doesn't add additional acid and water to the wastewater treatment and separation process as is encountered with split streaming wherein a second acid is added to lower the pH to generate free SO2 for disinfection. Consequently, the treated wastewater volume is not affected; thereby saving additional treatment water.

Conditioning of the solids is defined as treating the filtered solids with sufficient SO2 such that they will chemically dewater when allowed to drain, forming a fairly dry solid with a BTU content approximating wood chips or shavings. Conditioning generally results in a color change of the solids from a dark brown to a lighter gray brown color. Similarly, the SO2 treated liquids generally change from a greenish color to a lighter gray brown colloidal suspension color. The malodorous smell of the raw wastewater is also replaced by a slight acidic smell. Consequently, the conditioning point can easily be determined by injecting more and more SO2 into the wastewater until the color and odor changes occur—usually observed at a pH of approximately between 1.5 and 3.5, depending upon dwell time. Sulfur dioxide has lone electron pairs, which can act as a Lewis base. It can also act as a Lewis acid. The dissolved SO2 gaseous content also varies with temperature. For example, the grams/liter of dissolved sulfur dioxide in water at 20 degrees C. is 106.4 gr/l. It is 55.4 gr./l at 40 degrees. It is 32.5 gr./l at 60 degrees, and 21.3 gr./l at 80 degrees.

Consequently, this sulfurous acid treated wastewater system with free SO2 present in solution at a low pH forms a complex liquid/gas/solid phase chemistry system where reactions are difficult to exactly describe and quantify, but the above sulfurous acid wastewater conditioning endpoints are distinct. The conditioning of the wastewater and solids via oxidation/reduction reactions thus form self adhering solids, which shed water upon drying, and wastewater with high plant nutrients at the point where the odor reduction and color changes of the conditioned solids and liquids occur.

The sulfurous acid treated wastewater is then held in a detention vessel, which captures any excess SO2 emitted by the wastewater for reinjection, until the suspended solids agglomerate, the dissolved solids and ammonia are conditioned, and the required disinfection occurs. Exposure at an elevated pH of approximately 2 with a free SO2 concentration of at least 5 mg/l. for approximately 10 minutes results in complete disinfection according to Adams et al., U.S. Pat. No. 4,340,489. Detention at 60 minutes at a pH of 3 not only results in complete disinfection, but little significant additional solids separation and agglomeration occurs according to the Montalvo test results discussed below.

The agglomerated solids from the sulfurous acid treated wastewater may then be further screened to remove fine suspended solids in the separated treated wastewater at the level required by the end user effluent handling requirements for disposal. This is not necessary for irrigation canal discharge where the 425 micron particles passing through the GT500 weave of the Geotubes produced by Ten Cate Nicolan of Atlanta, Ga. will not interfere with water handling. However, for irrigation sprinkler usage, suspended particulates in the treated liquids must be reduced to under 200 microns. To remove these fine colloids, a Geotube® Model GT1000 tighter weave polypropylene woven bag sized to fit within another roll-off container is employed, which leaves fine suspended conditioned solids approximately 150 microns in size. These fines can be totally removed with finer filter bags approximately 100 microns or less in size to produce a clear filtrate solution containing dissolved solids and ammonia as discussed below. According to Ten Cate Nicolan, these drain bags normally act in three stages:

Containment: High strength permeable geotextiles with uniquely designed retention properties are fabricated into Geotube® brand containers that can be filled with fine grain sludge, hazardous contaminated soils, or dredged waste materials.

Dewatering: Excess water drains from the Geotube® brand containers through the small pores in the geotextiles resulting in effective dewatering and efficient volume reduction of the contained material. This volume reduction allows for the repeated filling of the Geotube® brand container. In many cases the decanted water is of a quality that can be returned to native waterways or for reuse.

Consolidation: After the final cycle of filling and dewatering, the retained fine grain materials can continue to consolidate by desiccation because the residual water vapor escapes through the geotextile.

The screened sulfurous acid wastewater filtrate is then pH adjusted to reduce the biocidal properties of the free SO2 in the wastewater by raising the pH with dry or hydrated lime to provide the pH required for subsequent environmental biological treatment. The calcium added off-sets any sodium buildup allowing the SO2 treated wastewater to be employed in saline soils to promote plant growth.

The screened pH adjusted sulfurous acid filtrate of the wastewater inflows is high in dissolved solids and nutrients and some ammonia, with low salts, providing a solution which promotes rapid bacteria and plant growth, which can be measured by its high BOD's. It is then environmentally biologically treated, preferably by land applying it for plant consumption, where the dissolved solids and ammonia act as soil amendments, plant nutrients to promote plant growth, as well as providing some insect repellant protection as it has been observed that insects avoid fields where the sulfurous acid solutions have been applied. The types of crops selected, or the manner of application is determined by the local gray water consumption restriction regulations.

Alternatively, the filtered, disinfected, pH adjusted wastewater may be passed through aqueous plants or bacterial microbes for reduction of the dissolved solids and ammonia for BOD compliance to produce water of sufficient quality to meet open stream and ocean effluent discharge requirements. For example, an existing wastewater treatment plant's aerobic digesters may be used for this purpose, or preferably the conditioned wastewaters are passed through wetlands for reduction or removal of these dissolved solids and ammonia from the wastewater to produce high quality water meeting BOD discharge requirements.

When adjacent off-site aqueous plant and/or aerobic bacteria are available for employment for reduction of the dissolved solids and ammonia in the filtered liquid fraction before disposal into an open stream or ocean, the BOD reduction effluent requirements are met with minimal capital cost expenditure. Alternatively, duckweed aquaculture ponds may be employed for this purpose where land costs are not prohibitive and sufficient lands for ponding is available.

As discussed, the deodorizing and conditioning of the wastewater is preferably accomplished by passing the wastewater through a sulfurous acid generator for admixing with sulfur dioxide at a pH which generates sufficient free SO2 to condition solids for separation and deodorize the wastewater. The sulfurous acid generator produces SO2 as needed in its aqueous form minimizing exposure to this biocidal gas.

If heavy metals are present in sufficient amounts in the filtered SO2 treated liquid fraction, the separated treated wastewater pH is raised to precipitate heavy metals contained in the wastewater for filtration removal, resulting in metal free filtrate. A pH of up to 11 will precipitate all of the heavy metals as metal hydroxides, which can be removed with filtration. This high pH is then acid reduced for environmental biological treatment—usually to a pH range of approximately 6 to approximately 8. Other factors in the selection of this pH are the soil alkalinity in a region, and whether the treated wastewater will be land applied or discharged to an aqueous environment.

The high pH around 11 also causes ammonia to separate into a gas for possible removal through scrubbing where the ammonia level in the acid treated wastewater is too high for secondary recovery water reusage. However, for most SO2 treated wastewaters, plant consumption is adequate for ammonia removal.

The chemically dried solids are low in water content and have the consistency of fibrous cardboard, which powders, when ground. Tests at the Montalvo Wastewater Treatment Plant of solids separated with a GT1000 Geotube indicated a treated solids BTU content of 6090 BTU's/lb, and a moisture content of 7.3% of its oven dry weigh[1], which are acceptable for municipal burners.

[1] moisture content for wood ranges from 0% oven dried wood to greater that 200% for a living tree, using this lab formula MC %=(weight of moist wood–weight of oven dried wood)/(weight oven dried wood)×100%

The dwell tank holding time varies based on the wastewater content and the pH utilized. It is selected to sufficiently agglomerate the suspended solids for capture within the porous bag. The longer the holding times the more agglomeration results. However, after about one half hour, separation of the majority of the solids, which are going to agglomerate, has occurred. The remaining small colloidal fines remain in suspension and can be removed, if desired by using tighter mesh bags or filters or filtration media for separation. The separated suspended solids are then allowed to chemically dewater in the porous bag to provide the high BTU content solid with low water content for burning or gasification.

In extreme climates subject to freezing, other filtering means, such as belt presses and screening means, which can be housed in a heated enclosure may be employed, such as the Finescreen Monster™ produced by JWC Environmental of Santa Ana, Calif.

The following is a preferred universal chemical/biological wastewater treatment plant method for wastewater inflow streams with dissolved and undissolved solids, which can be chemically dewatered by the injection of sulfur dioxide to condition and deodorize both the liquids and solids for recovery. The method comprises:

a. screening the variable wastewater flows through filtration means, which separates and captures the coarse solids from the filtered liquids, b. deodorizing and conditioning the filtered liquids by passing it through a sulfurous acid generator for admixing with sulfur dioxide at a pH which generates sufficient free SO2 to acidify and condition solids for separation and deodorize the wastewater based on dwell time, the screening porosity selected such that the inflow stream does not plug up the sulfurous acid generator, c. passing a portion of the sulfurous acid treated separated wastewater stream through the filtration means to condition and chemically dewater the separated captured solids, d. transmitting the acidified filtered liquids into a detention vessel and holding the same for a period of time until the wastewater odor is suppressed and the suspended solids are conditioned to agglomerate and separate from the liquid fraction of the wastewater for solids separation by filtration; and the dissolved solids and ammonia are conditioned and the required effluent disinfection occurs, e. pH adjusting the screened treated wastewater by raising its pH to reduce the biocidal properties of the free SO2 in the wastewater and provide the required pH for subsequent environmental biological treatment, and f. environmentally biologically treating the separated treated wastewater by land applying it for plant consumption, and/or passing it through aqueous plant or microbial reduction of the dissolved solids and ammonia for BOD compliance to produce water of sufficient quality to meet open stream and ocean effluent discharge requirements.

Unless the heavy metals are high, pH adjusting of the separated treated wastewater to precipitate heavy metals contained in the wastewater for filtration removal is not required. The pH adjusted acid treated wastewater is thus raised to the required pH for subsequent environmental biological treatment for polishing the separated water to the end user requirements. The chemically dewatered separated solids are then preferably disposed of in a municipal burner or gasifier. Alternatively, they may be land applied as they are disinfected and the heavy metals have been acid leached from them in the SO2 treatment process.

Apparatus

An example of a preferred skid mounted chemical/biological wastewater treatment plant apparatus for wastewater comprises screening means for receiving variable wastewater influent flows from a municipal wastewater gathering system. The screening means separate large suspended solids to a level suitable for an end user's needs. The entrapped screened suspended solids are periodically treated with sulfurous acid to chemically dewater and disinfect the solids before disposal.

The screened wastewater inflows are then passed through a series of mesh bags mounted on roll-off trailers with a weave preferably selected to contain odors of entrapped suspended solids. The separated wastewater liquids are then passed through a sulfurous acid generator for injecting SO2 into the screened wastewater. The sulfurous acid treated wastewater is repeatedly passed through the sulfurous acid generator, if required, until a pH is generated with sufficient sulfurous acid and free SO2 for odor suppression and conditioning the suspended solids. At a pH of approximately 1.5 to 3.5, any remaining suspended solids agglomerate and separate from the liquid fraction of the wastewater for solids separation by filtration. The sulfinurous acid treated wastewater filtrate is then pumped into detention vessels.

If the wastewater treatment plant does not have an auger or grinder to reduce the size of the screened suspended solids in the wastewater inflows, similar comminuting means are included. before passing the solids through the woven mesh bags. The detention vessel holding time is selected to deodorize and condition the SO2 treated wastewater influent, until the suspended solids agglomerate, dissolved solids and ammonia are conditioned, and the required effluent disinfection occurs. The detention vessels are enclosed to capture any excess SO2 released from the SO2 treated wastewater influent for re-injection into the entering wastewater inflows.

Secondary screening means, such as filtration bags, belt presses, and other mechanical separators may be employed to further separate the suspended solids from the sulfurous acid treated wastewater from the drained detention vessels, if required. The type of filtration employed is selected to remove suspended solids at a level required by the specific end use effluent requirements for disposal. Again, the preferred secondary screening means comprises acid resistant porous bags placed on a roll-off container structured to receive the sulfur dioxide treated wastewater. The drain bag is selected with a mesh sized to collect and separate particles of suspended solids of a desired size leaving a solution of a desired colloid content. For most filtration applications, passage through a single drain bag provides the desired filtration. Alternatively, these bags may be employed in series to promote faster draining by first removing the larger particles, before passing the suspended colloid particles through a bag with finer mesh. For example, the Ten Cate Geotube Model GT500 drain bag has a US Sieve # 40 with an apparent opening size of 425 mm more particularly described in the table below is used to first remove larger particles from the entering wastewater.

If these drain bags are interconnected and placed in series, they are sized so that the flow rates through the bags allow continuous flow—i.e. the GT 5000 bags with a flow rate of 813 l/minute/m2 in communication with the GT 1000 bags with a flow rate of 240 l/minute/m2 requires them to be three and a third times larger, or their number of same size bags increased so that the flow rates through both bags provide continuous flow. Where the plant drainage footprint is of sufficient size, the matching of the drain bag sizes is not critical, and standby extra capacity drain bags are generally employed to accommodate storm wastewater surges or uneven flows.

These combination containerized bags, when placed in series, thus produce a filtrate substantially less than 200 microns required for land application through existing sprinkler and irrigation equipment.

| Mechanical Properties | Test Method | Unit | Minimum Average Roll Value | |
|---|---|---|---|---|
| | | | Machine Direction | Cross Direction |
| Wide Width Tensile Strength (at ultimate) | ASTM D 4595 | kN/m (lbs/in) | 70 (400) | 96.3 (550) |
| Wide Width Tensile Elongation | ASTM D 4595 | % | 20 (max.) | 20 (max.) |
| Factory Seam Strength | ASTM D 4884 | kN/m (lbs/in) | 70.1 (400) | |
| Apparent Opening Size (AOS) | ASTM D 4751 | mm (U.S. Sieve #) | 0.425 (40) | |
| Water Flow Rate | ASTM D 4491 | l/m/m$_2$ (gpm/ft$_2$) | 813 (20) | |
| Mass/Unit Area | ASTM D 5261 | g/m$_2$ (oz/yd$_2$) | 585 (17.3) (Typical Value) | |
| UV Resistance (% strength retained after 500 hrs) | ASTM D 4355 | % | 80 | |

The filtered treated wastewater may then be run through a Ten Cate Geolon GT1000 drain bag composed of high-tenacity polyester multifilament yarns, which are woven into a stable network such that the yarns retain their relative position. The Geolon GT1000 has a US Sieve #100 with an apparent opening size of 150 microns more particularly described in the table below.

The filtered acidified wastewater is then collected and pH adjusted employing pH adjustment means, such as the skid mounted lime injection equipment produced by Metalfab, Inc. of Vernon, N.J. This particular equipment is a continuous lime feeding apparatus employed for adjusting the separated treated wastewater to reduce the biocidal properties of the

| Mechanical Properties | Test Method | Unit | Minimum Average Roll Value | |
|---|---|---|---|---|
| | | | MD | CD |
| Wide Width Tensile Strength (at ultimate) | ASTM D 4595 | kN/m (lbs/in) | 175 (1000) | 175 (1000) |
| Wide Width Tensile Elongation (at ultimate) | ASTM D 4595 | % | 15 (max.) | 15 (max) |
| Trapezoidal Tear | ASTM D 4533 | kN (lbs) | 3.6 (800) | 3.6 (800) |
| Factory Seam Strength | ASTM D 4884 | kN/m (lbs/in) | 87.5 (500) | |
| Puncture Strength | ASTM D 4833 | kN (lbs) | 1.8 (400) | |
| Apparent Opening Size (AOS) | ASTM D 4751 | mm (U.S. Sieve #) | 0.150 (100) | |
| Water Flow Rate | ASTM D 4491 | l/m/m$_2$ (gpm/ft$_2$) | 240 (6) | |
| UV Resistance (% strength retained after 150 hrs) | ASTM D 4355 | % | 65 | | free SO2 in the wastewater and provide the pH required for subsequent environmental biological treatment.

Other pH reduction means may also be employed, such as injecting a stream of hydrated lime or ammonia from a vat into the acidified wastewater to reduce its pH before entering a collection basin or reservoir. Although various basic chemicals may be employed for pH reduction, lime provides calcium ions to aid in soil conditioning and off-set the effects of salt buildup in the soil, which retard plant growth.

In cold weather conditions where long freezes are encountered, a mechanical separator is employed instead of the drain bags to remove the suspended solids. Continuous bag screening systems such as the Finescreen Monster™ and Bandscreen Monster™ produced by JWC Environmental of Costa Mesa, Calif. have small footprints and produce a fairly dry filtrate solid. These units can be housed indoors, along with the dwell tanks, and liming equipment in a small enclosed building to provide an all weather chemical biological wastewater treatment system. The screens are generally selected to only remove the larger particle unwanted conditioned suspended solids to provide treated wastewater with sufficient plant nutrients for field application. However, if desired, finer and finer screens could be employed to provide more polished filtered water. A second pass of acidified sulfurous acid is then periodically injected through the filtrate to disinfect and dewater the filtrate.

The pH adjusted screened and treated wastewater is then passed through an environmental biological system for further reduction of the dissolved and undissolved solids and ammonia, or by land applying it for plant consumption. The manner of land application is dependent upon the type of crop and whether it is consumed raw. When the pH adjusted separated and treated wastewater is pathogen free, the manner of land application is generally not restricted. However, use on nonconsumable crops only requires partial disinfection and is the preferred method of disposal. Alternatively, the pH adjusted separated and treated wastewater may be passed through a wetlands transition zone where aqueous plant or microbial reduction of the dissolved and undissolved solids and ammonia occurs to reduce BOD's to produce water of sufficient quality to meet open stream and ocean effluent discharge requirements.

Wastewater treatment inflows entering a wastewater treatment plant generally have relatively low heavy metals content. However, in those regions near mining tailings or industrial sites, heavy metal contamination of the liquids entering the treatment plant can be significant. Also, where the heavy metals in the solids are so high limiting their use for land application, these solids heavy metals are removed in the process by acid leaching them into the liquid fraction by the sulfurous acid wastewater treatment. To remove these heavy metals from the liquid fraction, the pH of the separated treated wastewater is raised sufficiently to precipitate those heavy metals contained in the wastewater as metal hydroxides for filtration removal via belt presses or tighter weave polyethylene woven bags or other filtration means.

The actual design of the package wastewater treatment apparatus employing the method depends on the polishing requirements of the separated water for end use. The small footprint and rapid chemical treatment of the wastewater inflows also provides opportunities to install the system and re-inject the treated wastewaters at various points in an existing wastewater treatment plant. Thus, portions of an existing wastewater treatment plant's processing equipment are often incorporated in treating the solids and separated liquids by combining treatment streams and solids. For example, where an existing plant has sequential batch reactors or primary clarifiers to remove the variable inflow solids, the woven containerized pre-treatment filter bags are not required. The wastewater treatment plant's separated filtrate is directly acidified with the acid generators and passed through the dwell tanks for subsequent pH adjustment and land application. Also, if the existing wastewater treatment plant produces a lower BOD dissolved solid/liquid stream, the wastewater treatment plant streams may be combined with the higher acid treated BOD liquid stream to produce an overall lower dissolved solid liquid fraction requiring less biological treatment.

Preferably, the package chemical/biological wastewater treatment plant apparatus is operated such that the calcium content of the waste water is increased to affect a decrease of the Sodium Adsorption Ratio (SAR) of the waste water to enhance the agronomic condition of the soil to which it is applied. Plants are detrimentally affected, both physically and chemically, by excess salts in some soils and by high levels of exchangeable sodium in others. Soils with an accumulation of exchangeable sodium are often characterized by poor tilth and low permeability making them unfavorable for plant growth. Plant growth is important for mine reclamation for several reasons: (i) it provides an erosion control measure for hill slope erosion and stream bank erosion, (ii) it allows for revegetation of reclaimed areas, and (iii) it can possibly aid in metals uptake by phytoremediation. Sodium adsorption ratios (SAR), along with pH, characterize salt-affected soils. It is an easily measured property that gives information on the comparative concentrations of Na+, Ca2+, and Mg2+ in soil solutions. The equation used to calculate SAR is given as follows:

$$SAR = \frac{[Na^+]}{\sqrt{\frac{1}{2}([Ca^{2+}]+[Mg^{2+}])}}$$

where [Na+], [Ca+], and [Mg2+] are the concentrations in mmol/L of sodium, calcium, and magnesium ions in the soil solution. Concentrations of sodium, calcium, and magnesium are determined by first extracting the ions from the soil into solution. The solution is then analyzed to determine concentrations of the selected ions. Na+, Ca2+, and Mg2+ concentrations are commonly determined using atomic absorption spectrometry (AA). The SAR of a soil extract takes into consideration that the adverse effect of sodium is moderated by the presence of calcium and magnesium ions. When the SAR rises above 12 to 15, serious physical soil problems arise and plants have difficulty absorbing water according to some studies.

SUMMARY

The chemical/biological package wastewater treatment plant method and apparatus optimizes sewage treatment by adjusting the effluent to meet the needs of an end user. It employs rapid sludge chemical dewatering and disinfection technology in conjunction with an environmental biological system for treating the separated treated wastewater by land applying it for plant consumption, and/or passing it through aqueous plant or microbial reduction of the dissolved solids and ammonia for BOD compliance to produce water of sufficient quality to meet open stream and ocean effluent discharge requirements. It has a small footprint and can be integrated to supplement and/or replace the existing equipment and processes of an existing wastewater treatment plant to optimize solids separation and treated water recovery. Consequently, streams of sulfurous acid treated influent may be combined with effluent from the existing plant to provide a blended effluent meeting an end user's requirements.

DESCRIPTION OF THE ILLUSTRATED EMBODIMENTS

Figure 1:
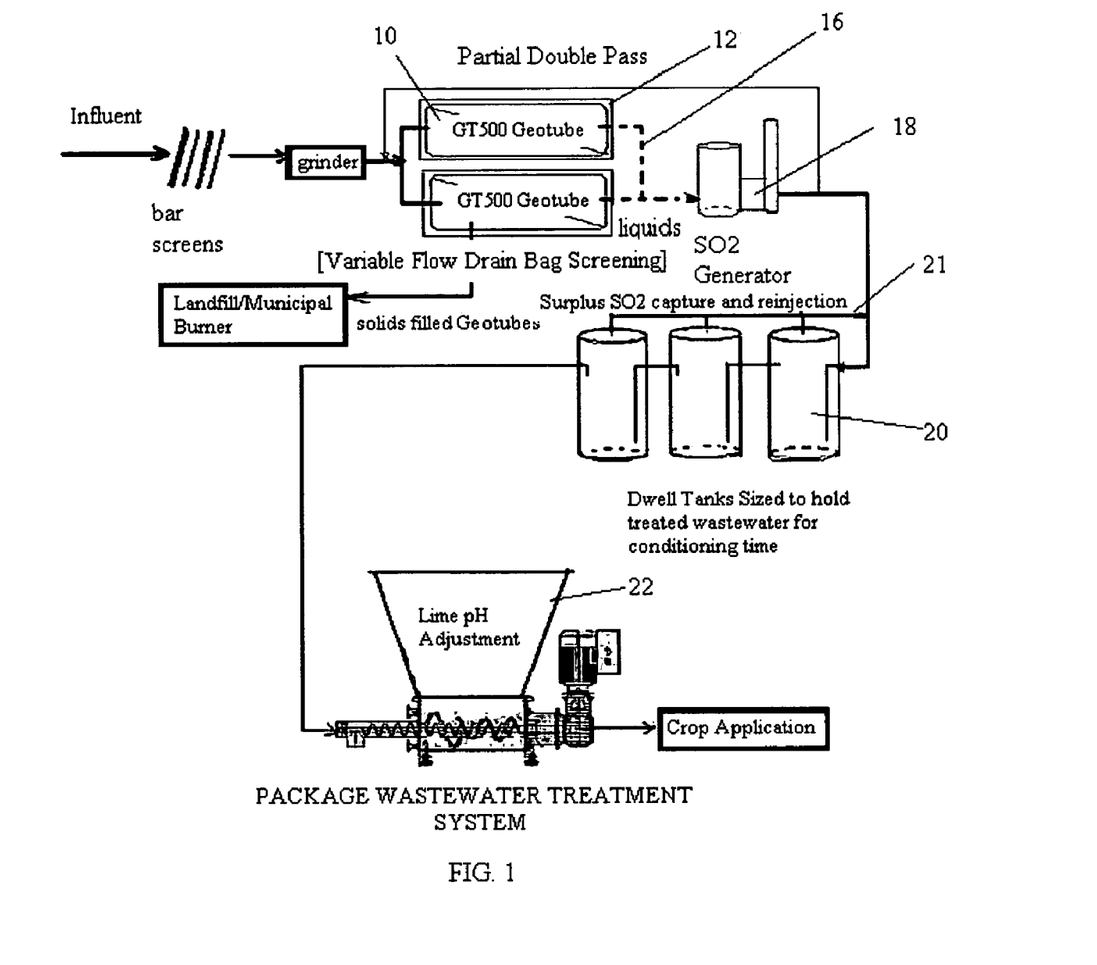
FIG. 1 illustrates a preferred embodiment of the invention.

An embodiment of the method and apparatus of the present invention is shown in FIG. 1. It comprises taking the screened and ground wastewater influent and passing it through a series of GT 500 Geotubes 10 for further screening and collection of the solids. The Geotubes 10 are placed in roll-off containers 12, which have drain ports 14 shown in FIG. 2. The GT 500 Geotube 10 has odor containment properties, and allows variable wastewater flows to pass through for collection in the containers 12, while retaining the courser solids. Piping 16 associated with the drain ports 14 collects the filtered wastewater and passes it through a sulfur generator 18 for acidification. Because the courser solids are removed, the sulfur generator 18 will not plug. The sulfur generator 18 includes variable controls to add more or less sulfur dioxide to the filtered wastewaters as the flows increase or decrease so that a fairly constant acidic composition is maintained. To insure disinfection, promote chemical dewatering, and odor control of the captured solids, periodically acidified wastewater is passed through the GT500 Geotubes.

The screened and acidified wastewater is then passed through a series of interconnected dwell tanks 20 sized so that the flows there through have the required dwell time for conditioning and disinfection. The filtered conditioned and disinfected wastewater is then passed through liming equipment 22 before land application.

Figure 2:
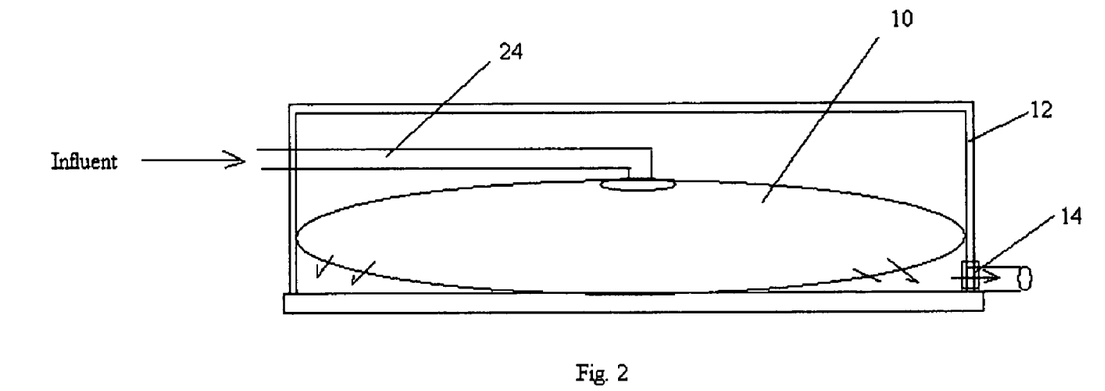
FIG. 2 illustrates a drain bag in a roll-off container.
Figure 3:
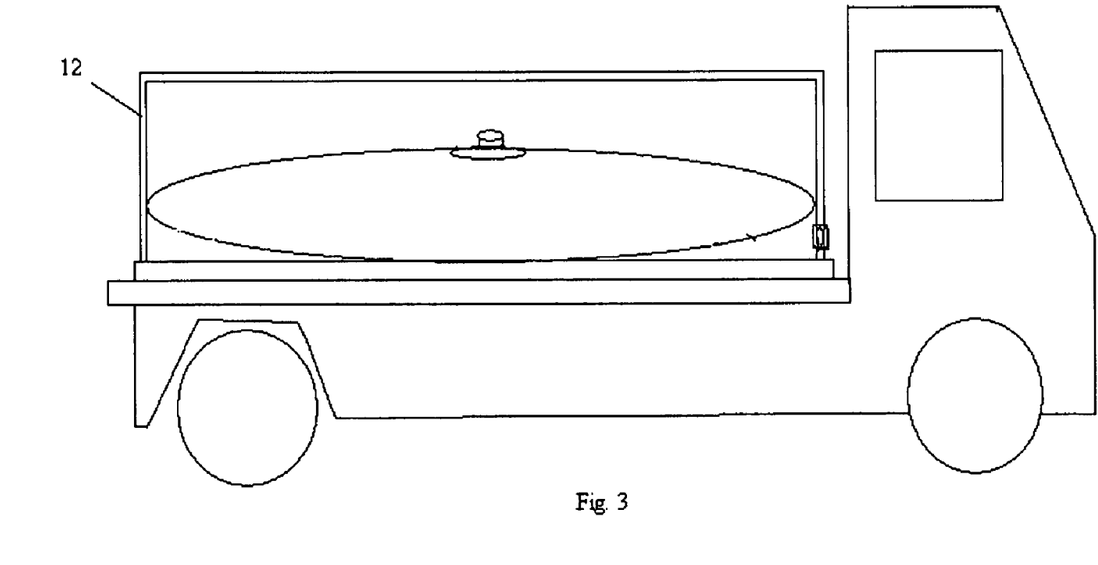
FIG. 3 illustrates a filled drain bag and roll-off container being hauled off for bag disposal

As shown in FIG. 2, the drain bags 10 may be placed in an enclosed container if odors are not contained in the bags 10. When filled, the fill hoses 24 are removed from the filled bag 10 and another roll-off container 12 with fill bag 20 is connected to the fill hose 24 to continue to receive and filter the wastewater influent. The filled bag 20 in the roll-off container 12 is then loaded on trucks for hauling to a landfill or municipal burner or gasifier. The roll-off containers 12 are preferably of standard size for highway hauling, and the drain bags 10 are sewn to fit therein.

The package chemical/biological wastewater treatment plant 25 can be rapidly deployed and constructed in flood planes and small footprints of existing plants. Consequently split streams may be combined with the filtered, conditioned, disinfected, pH adjusted wastewater, if desired.

Figure 4:
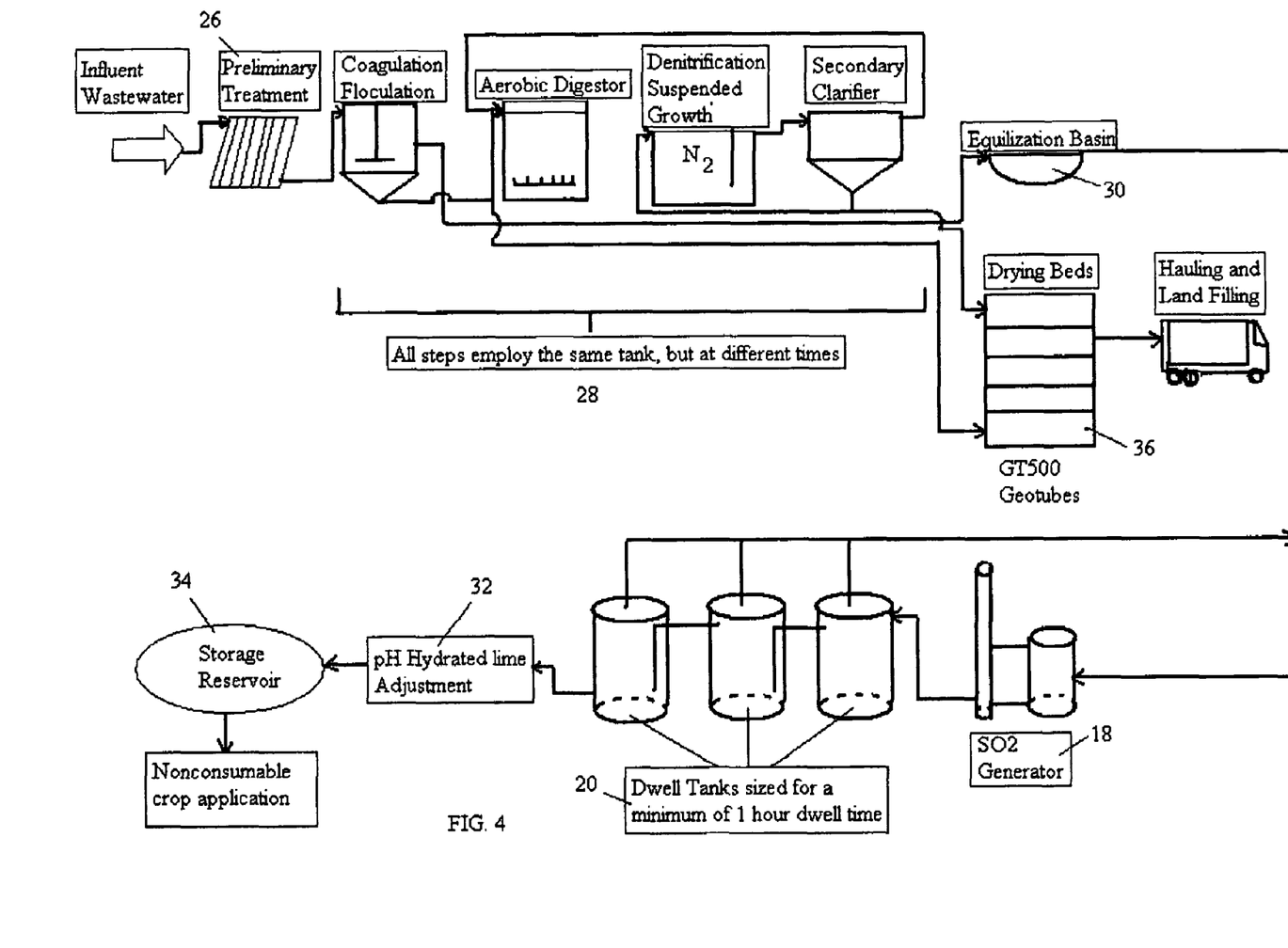
FIG. 4 illustrates the Montalvo Wastewater Treatment Plant adapted with process of the invention of FIG. 1.

FIG. 4 illustrates how the package chemical/biological wastewater treatment plant 25 may be installed at an existing facility using a majority of its components. The illustration shows the Montalvo Municipal Improvement District Water Pollution Control Plant in Ventura, Calif. adapted with the package chemical/biological wastewater treatment plant 25 for recovery of wastewater for land application. Instead of using drain bags 10 in roll-off containers 12 for variable flow screening, the present bar screens and grinders 26 and the sequencing aerobic and denitrification batch reactors 28 are used to filter the suspended solids for discharge into an equalization basin 30. The clear decant from the equalization basin 30 is then passed through a sulfurous acid generator 18 for acidification and passage into the dwell tanks 20. Acidified conditioned wastewater is then pH adjusted with a drip hydrated lime system 32 employing carboys (not shown) delivered to the site as needed. The pH adjusted conditioned wastewater is then collected in a storage reservoir 34 for final pH testing before land application.

The solids in the present Montalvo drying beds 36 may be periodically treated with sulfurous acid from the dwell tanks 20 to aid in chemical dewatering.

This package chemical/biological wastewater treatment plant 24 provides acid treated disinfected and conditioned wastewater, which may be land applied where small amounts of ammonia and dissolved solids provide soil amendment. Further, the resulting volume of separated solids is considerably less than that encountered in the present operations, while making available approximately 365 acre feet of secondary recovery water for agricultural and landscaping use. The resultant treated filtered wastewater is thus disinfected without need for further chlorine treatment. As the land surrounding the plant contains alkaline soils, the treated filtered wastewater is preferably pH adjusted with lime until an acidified treated secondary recovery water of a pH of approximately 6.5 to reduce bicarbonate buildup in the soil is produced for better plant growth and water usage.

Although this specification has made reference to the illustrated embodiments, it is not intended to restrict the scope of the claims. The claims themselves recite those features deemed essential to the invention.

We claim:
1. A chemical/biological wastewater treatment method for wastewater with dissolved and undissolved solids and nutrients comprising:
   a. determining effluent discharge and disinfection limits for land application, open water discharge, and solids disposal requirements for a wastewater treatment plant's treated wastewater,
   b. flow-separating suspended solids in wastewater inflows for disposal to reduce particle size of suspended solids in separated wastewater inflows,
   c. deodorizing and conditioning the separated wastewater inflows by injecting into the wastewater inflows sulfur dioxide at a pH that generates sufficient sulfurous acid with free $SO_2$ to condition solids for disinfection, separation and to deodorize the separated wastewater inflows,
   d. holding the sulfur dioxide treated separated wastewater inflows in the same vessel into which the sulfur dioxide was injected, or a separate detention vessel, which captures any excess $SO_2$ emitted by the wastewater for reinjection, at a pH between approximately 1.5 and 4.5, depending upon dwell time, until a conditioned wastewater is produced where suspended solids agglomerate and dewater by shedding water upon separation and drying, dissolved solids and ammonia are sulfurous acid treated resulting in odor reduction and color changes of the conditioned solids and liquids, and required effluent disinfection occurs to meet disinfection limits,
   e. pH adjusting the conditioned wastewater to reduce the biocidal properties of any free $SO_2$ in the conditioned wastewater and provide the pH required for subsequent environmental biological treatment for reduction of the dissolved and suspended solids and ammonia to meet applicable land and open water discharge limits by either:
  i. land applying the conditioned wastewater for plant consumption in accordance with applicable land discharge limits, and/or
  ii. passing it through
    1. aqueous vegetation for consumption, or
    2. microbial reduction
  of the dissolved and suspended solids and ammonia for BOD compliance to produce water of sufficient quality to meet applicable open water discharge limits.

2. A chemical/biological wastewater treatment method according to claim 1, wherein the pH adjusting of the conditioned wastewater first raises the conditioned wastewater to a pH level of up to 11 to precipitate heavy metals contained in the conditioned wastewater as metal hydroxides for removal, and the resultant metal free filtrate is then pH reduced for environmental biological treatment.

3. A chemical/biological wastewater treatment method according to claim 1 wherein the deodorizing and disinfecting of the wastewater comprises passing the separated wastewater inflows through a sulfurous acid generator for admixing with sulfur dioxide at a pH of between approximately 1.5 and approximately 4.5, depending upon dwell time, which generates sufficient free $SO_2$ to condition and disinfect the wastewater.

4. A chemical/biological wastewater treatment method according to claim 1, wherein separating suspended solids in wastewater inflows comprises passing the wastewater through at least one woven bag placed in a roll-off container structured to collect screened liquids draining through the woven bag for passage through a sulfurous acid generator; the woven bag porosity selected such that the inflow stream does not plug up the sulfurous acid generator and for the desired separated solids odor containment.

5. A chemical/biological wastewater treatment method according to claim 1, including passing the conditioned wastewater through at least one acid resistant porous woven drain bag placed in a roll-off container structured to collect filtered conditioned wastewater passing through, the drain bag mesh sized to leave a solution of a desired solids particle size before pH adjusting.

6. A chemical/biological wastewater treatment method according to claim 5, wherein drain bag holding time is selected to sufficiently agglomerate the suspended solids for capture within the porous woven drain bag.

7. A chemical/biological wastewater treatment method according to claim 6, wherein the separated suspended solids in the drain bag are allowed to dewater to provide solids with a high BTU content solid with low water content for disposal, burning, or gasification.

8. A chemical/biological wastewater treatment method for wastewater inflow streams with dissolved and undissolved solids comprising:
  a. determining effluent discharge and disinfection limits for land application, open water discharge, and solids disposal requirements for treatment plant's treated wastewater,
  b. deodorizing and conditioning the treatment plant wastewater inflows by:
    i. drain bag screening and separating of the solids in the wastewater inflow streams to reduce the particle size of the suspended solids in the separated wastewater inflows to form screened wastewater,
    ii. passing the screened wastewater through a sulfurous acid generator for admixing with sulfur dioxide to form sufficient sulfurous acid at a pH between approximately 1.5 and approximately 4.5 to inject sufficient free $SO_2$ to condition solids for separation and deodorize the acidified wastewater; the drain bag weave porosity selected such that the inflow stream solids particles in the screened wastewater do not plug or interfere with the operation of the sulfurous acid generator and contain odors of any separated solids,
  c. transmitting into a detention vessel the acidified wastewater to hold the same for a period of time until the wastewater odor is suppressed and the suspended solids are conditioned to agglomerate and separate from the liquid fraction of the acidified wastewater and dewater by shedding water upon drying, and the dissolved solids and ammonia are sulfurous acid treated resulting in odor reduction and color changes of the conditioned solids and liquids and the required disinfection occurs,
  d. screening the agglomerated solids from the acidified wastewater to remove suspended solids at a level required by effluent discharge limits and requirements for disposal, leaving a high BOD dissolved solids and ammonia nutrient conditioned wastewater,
  e. pH adjusting the conditioned wastewater by raising its pH to reduce the biocidal properties of free $SO_2$ in the conditioned wastewater and provide the required pH of between approximately 6 to approximately 8 for subsequent environmental biological treatment, and
  f. environmentally biologically treating the separated nutrient liquid solution for reduction of the dissolved and undissolved solids and ammonia to meet applicable land and open water discharge limits by either:
    i. land applying the conditioned wastewater in accordance with end user requirements for disinfection, and plant consumption within land discharge limits, and/or
    ii. passing it through
      1. aqueous vegetation consumption, or
      2. microbial reduction
    of the dissolved and undissolved solids and ammonia for BOD compliance to produce water of sufficient quality to meet applicable open water effluent discharge limits.

9. A chemical/biological wastewater treatment method according to claim 8, wherein the drain bag has a mesh sized to collect and separate particles of suspended solids of a desired size leaving a screened wastewater suitable for use with irrigation equipment.

10. A chemical/biological wastewater treatment method according to claim 8, wherein the holding time in the detention vessel is selected to sufficiently agglomerate the suspended solids for capture within the mesh of the drain bag.

11. A chemical/biological wastewater treatment method according to claim 8, wherein the separated agglomerated solids from the acidified wastewater are allowed to dewater to provide a high BTU content solid with low water content for land application, burning or gasification.

12. A chemical/biological wastewater treatment method according to claim 8, wherein the pH adjusting of the conditioned wastewater is raised up to approximately 11 to first precipitate heavy metals contained in the wastewater as metal hydroxides for filtration removal, and the resultant metal free filtrate is then pH reduced for subsequent environmental biological treatment.

13. A chemical/biological wastewater treatment method according to claim 8, including polishing the separated water to produce water of sufficient quality to meet open stream and ocean effluent discharge requirements.

14. A chemical/biological wastewater treatment method according to claim 8, wherein the separated agglomerated solids from the acidified wastewater are dried by dewatering and admixed with mechanically separated wastewater solids having a higher moisture content in a ratio to provide a combined fuel with a reduced overall moisture content of than mechanically separated solids.

15. A chemical/biological wastewater treatment method according to claim 8, wherein the separated nutrient solution is land applied and has insect repellent properties.

16. A chemical/biological wastewater treatment method according to claim 1, including passing a portion of the conditioned wastewater periodically through the separated suspended solids for disinfection and dewatering before disposal.

17. A chemical/biological wastewater treatment method according to claim 1, including determining land application end user effluent requirements for disinfection, soil SAR, dissolved solids and ammonia soil amendments and plant nutrients and soil pH to promote plant growth; holding the sulfur dioxide treated separated wastewater inflows until the end user effluent requirements for disinfection and land application occur, and land applying the conditioned wastewater in accordance with an end user's effluent requirements.

18. A chemical/biological wastewater treatment method according to claim 17, wherein the pH adjusting is done with anhydrous or hydrated lime to raise the calcium ion concentration of the conditioned wastewater to adjust the soil SAR.

19. A chemical/biological wastewater treatment method according to claim 8, including determining land application end user effluent requirements for disinfection, soil SAR, dissolved solids and ammonia soil amendments and plant nutrients and soil pH to promote plant growth; holding the sulfur dioxide treated separated wastewater inflows until the end user effluent requirements for effluent disinfection and land application occur, and land applying the conditioned wastewater in accordance with a user's effluent requirements.

20. A chemical/biological wastewater treatment method for wastewater with dissolved and undissolved solids and nutrients comprising:
   a. determining end user effluent requirements for disinfection, soil SAR, dissolved solids and ammonia soil amendments and plant nutrients and soil pH to promote plant growth in compliance with applicable land application discharge limits, and effluent open water discharge limits and solids disposal requirements for a wastewater treatment plant's treated wastewater,
   b. separating suspended solids in wastewater inflows for disposal to reduce the particle size of suspended solids in separated wastewater inflows,
   c. deodorizing and conditioning the separated wastewater inflows by injecting into the wastewater inflows sulfur dioxide at a pH that generates sufficient sulfurous acid with free $SO_2$ to condition solids for separation and deodorize the separated wastewater inflows,
   d. holding the sulfur dioxide treated separated wastewater inflows in the same vessel into which the sulfur dioxide was injected, or a separate detention vessel, which capture any excess $SO_2$ emitted by the wastewater for reinjection, at a pH between approximately 1.5 and 4.5, depending upon dwell time, until a conditioned wastewater is produced where suspended solids agglomerate and dewater by shedding water upon separation and drying, dissolved solids and ammonia are sulfurous acid treated resulting in odor reduction and color changes of the conditioned solids and liquids, and the end user effluent requirements for effluent disinfection occurs,
   e. separating the suspended solids for disposal,
   f. pH adjusting the conditioned wastewater with anhydrous or hydrated lime to reduce the biocidal properties of any free $SO_2$ in the conditioned wastewater, increase the calcium ion concentration, and provide the pH required for subsequent environmental biological treatment for reduction of the dissolved and undissolved solids and ammonia to meet applicable land and open water discharge limits by either:
      i. land applying the conditioned wastewater in accordance with a user's disinfection, soil SAR, dissolved solids and ammonia soil amendments and plant nutrients and soil pH for plant consumption in accordance with applicable land discharge limits, and/or
      ii. passing it through
         1. aqueous vegetation for consumption, or
         2. microbial reduction
      of the dissolved and undissolved solids and ammonia for BOD compliance to produce water of sufficient quality to meet applicable open water discharge limits.

21. A chemical/biological wastewater treatment method for wastewater according to claim 20, wherein the wastewater inflows are screened through a drain bag to separate the solids in wastewater inflow streams to form screened wastewater, which is passed through a sulfurous acid generator for admixing with sulfur dioxide to form sufficient sulfurous acid at a pH between approximately 1.5 and approximately 4.5 to inject sufficient free $SO_2$ to condition the solids for separation and deodorize the acidified wastewater; the drain bag weave porosity selected such that the inflow stream solids particles in the screened wastewater do not plug or interfere with the operation of the sulfurous acid generator and contain odors of any separated solids.

22. A chemical/biological wastewater treatment method according to claim 21, wherein the pH adjusting raises the calcium ion concentration of the conditioned wastewater to adjust soil SAR.

* * * * *